Nov. 30, 1965 M. BEUGIN 3,220,735

AUTOMATIC SPEED CHANGER FOR A RECORD PLAYER

Filed April 9, 1962 3 Sheets-Sheet 1

INVENTOR
MICHEL BEUGIN

BY [signature]
AGENT

INVENTOR
*MICHEL BEUGIN*

BY
AGENT

INVENTOR
MICHEL BEUGIN
BY [signature]
AGENT

3,220,735
AUTOMATIC SPEED CHANGER FOR A RECORD PLAYER

Michel Beugin, Flers, France, assignor to North American Philips Company, Inc., New York, N.Y., a corporation of Delaware Filed Apr. 9, 1962, Ser. No. 186,607
Claims priority, application France, Apr. 13, 1961, 858,653
6 Claims. (Cl. 274—9)

This invention relates to a record player having means actuated by the weight of a record for automatically selecting the proper turntable speed according to the diameter of the spindle opening of the record to be played.

A record player is known from French Patent No. 1,246,823, October 17, 1960, in which the turntable speed is selected automatically by the spindle opening in the record and actuated by the weight of the record, however, the weight of the record in this known arrangement must move relatively large masses and/or overcome large friction forces whereas according to the improvement hereinafter described, the record's weight must move only a relatively small mass and overcome minor friction forces.

The construction disclosed is adapted for use in a side or slot loading record player of the type shown in U.S. Patent No. 2,943,861, to George E. Redfield, dated July 5, 1960.

Briefly described, the invention comprises a shiftable, record centering member which is moved by the weight of a record having a small spindle opening. This shiftable member is normally easily moveable and functions in its operative positions as a blocking member for setting further operatively connected means in selected positions whereby the speed of the turntable is determined.

The primary object of the invention is to provide a reliable, yet simple and inexpensive automatic speed changer for a record player.

The foregoing object and further objects and advantages will be apparent from the following detailed description of a presently preferred embodiment of the invention illustrated in the appended drawing in which.

Figure 2:
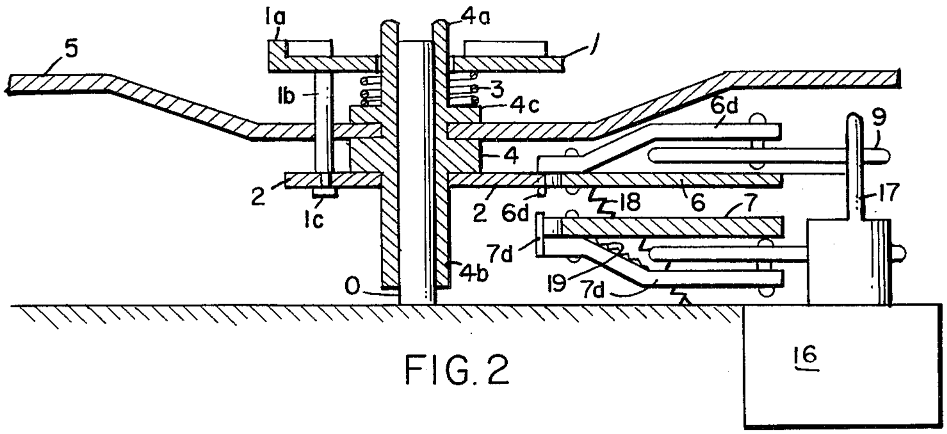
FIG. 2 is an enlarged partial view in elevation of a cross section taken along the section line of FIG. 1, looking in the directions of the arrows II, II.
Figure 1:
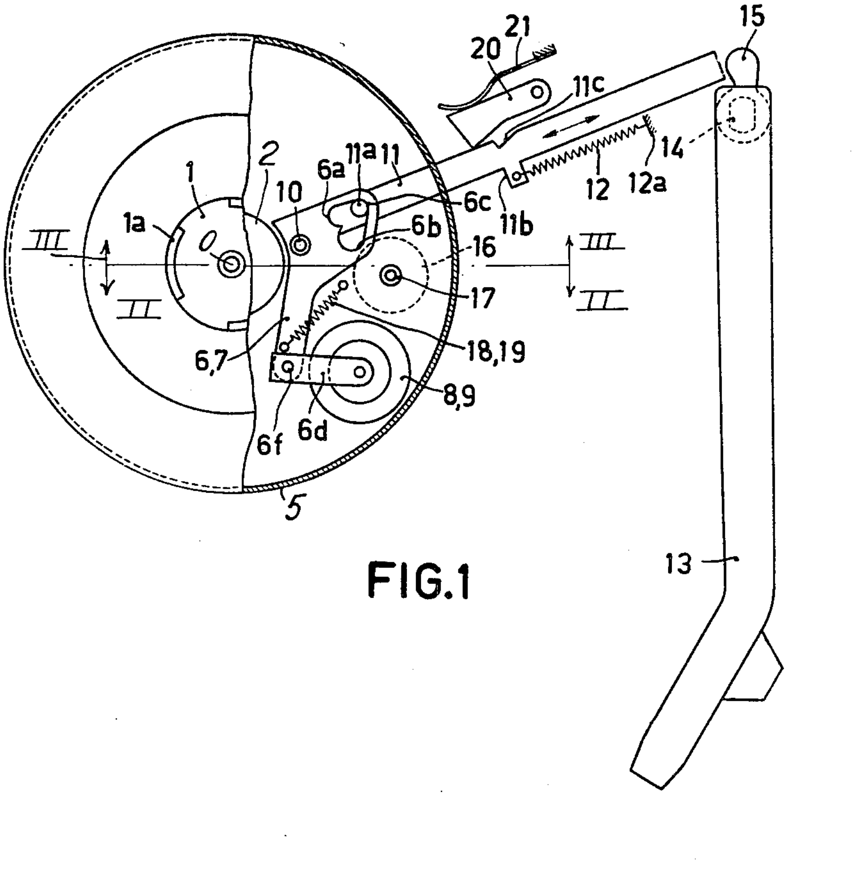
FIG. 1 is a plan view of a record player turntable, partly cut away, and speed changing mechanism according to the invention.
Figure 3:
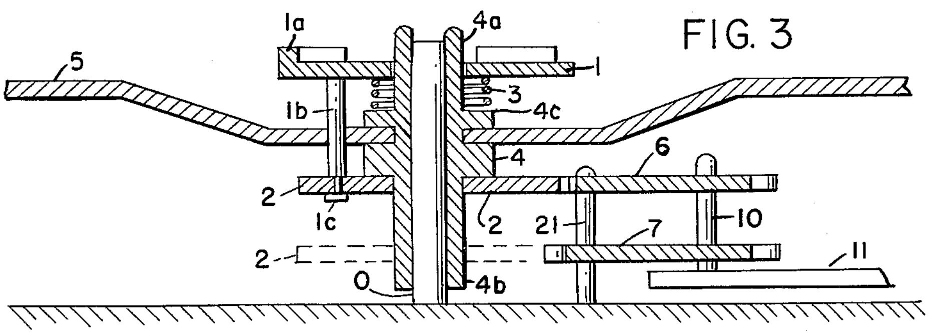
FIG. 3 is also an enlarged partial elevation in cross section taken along the section line of FIG. 1 looking in the direction of arrows III, III.

Referring to FIGS. 1, 2 and 3; the turntable 5 is journalled on a shaft O via a profiled sleeve 4 on which the turntable is fixed in any suitable manner. The shaft O is supported on the base of the record player in any known manner. A shiftable centering member 1, provided with projections 1*a* for centering 45 r.p.m. records, is slideably mounted on a cylindrical part 4*a* of sleeve 4. The centering member 1 is elastically supported by a spring 3 which bears on a collar 4*c* of sleeve 4. The centering member 1 is connected with a control member or slideable plate 2 by means of one or more pins 1*b* integral with member 1 and connected with control member 2 by a screw 1*c* or the like. Thus, when centering member 1 is depressed against spring 3 the control member 2 is also depressed, i.e. moves from the position shown (FIG. 2) to a lower position shown in phantom in FIG. 3. The sleeve 4 is also provided with a suitable cylindrical part 4*b* for guiding the member 2 as it slides thereupon. It will be apparent from the foregoing that the centering member 1 can be easily moved by the weight of a 33 r.p.m. record. For the smaller, lighter 45 r.p.m. records, the centering member 1 is held by the spring 3 in its elevated position shown in FIGS. 1, 2, 3; the projections 1*a* fitting within the centering hole of the record.

Referring more particularly to FIGS. 1 and 2, the control member 2 functions as a blocking element for either of the identical levers 6 and 7 depending on its position. In these figures, the member 2 is aligned with the uppermost lever 6, as a result, the lever 6 will be blocked by the control member 2 when lever 6 attempts to move in the direction of the shaft O. Movement of the lever 6 or 7 will be explained hereinafter. As shown in broken lines in FIG. 3, the control member 2, in its depressed position, is opposite the lever 7 and is likewise positioned to block this lever.

Each of the identical levers 6 and 7, generally in the shape of an obtuse crank, carry an idler wheel 8 and 9 respectively, suspended from an arm *6d* and *7d* which are each pivotally attached at one end of a respective lever. As best seen in FIG. 2, each arm has a right-bend or skirt *6d, 7d,* which prevents rotation of the arms 6, 7, and thus idlers 8, 9, in a clockwise direction. However, the arms 6, 7 and associated idlers 8, 9 are free to rotate in a counterclockwise direction, but the extent of movement in this direction is limited by the motor shaft 17 against which one or the other of the idlers normally abut in operation. Each of the levers 6, 7 are pivotally supported on a shaft 10 (FIGS. 1 and 3). Both, shaft O for the turntable and shaft 10 for the levers 6, 7 are fixed on the base plate of the record player in any known manner. The base plate is illustrated as a fixed surface in the drawing.

Pivotal movement of these levers 6, 7 is controlled by identical cordiform or heart-shaped openings in each of the legs of the levers remote from the arms *6d, 7d*. As shown in FIG. 1, a gudgeon 11*a* fixed on a reciprocal adjusting bar 11 extends through each of the cordiform openings. In the position of gudgeon 11*a* shown in FIG. 1, the levers 6, 7 are held retracted. When the adjusting bar 11 and gudgeon 11*a* move to the left in FIG. 1 each lever is urged by springs 18 and 19 to rotate in a counterclockwise direction whereupon one of the levers engages the control member 2. Thus, if the control member 2 is depressed, it blocks rotation of the lower lever 7 but upper lever 6 is free to rotate until the idler wheel 8 is engaged in operating position against the motor shaft 17 and the rim of the turntable 5 (note FIG. 4). Each cordiform opening is formed by two tangential semi-circles *6a, 6b* in lever 6 and semi-circles *7a, 7b* (FIG. 5) in lever 7. Opposite the tangential pair of semi-circles *6a, 6b* and *7a, 7b* is a third semi-circle *6c, 7c* respectively, two substantially straight tangential sides join the semi-circles *6a, 6c, 7a, 7c,* and *6b, 6c, 7b, 7c*. In other words, the cordiform opening in lever 7 is identical with the cordiform opening in lever 6.

Figure 4:
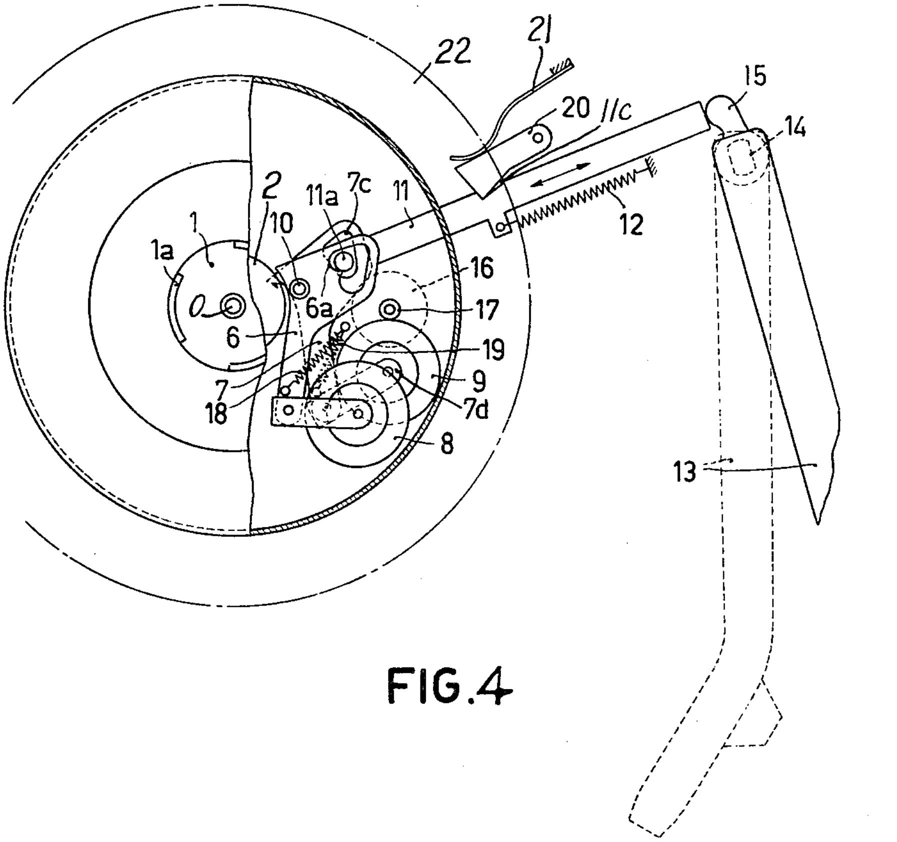
FIG. 4 is a plan view similar to FIG. 1 showing the speed changing mechanism of the invention in one of its operating positions (for 45 r.p.m. records).

The bar 11 is urged to the right in the drawing by a spring 12 (FIG. 1) and is moved to the left (FIGS. 4 and 5) when the pick-up arm 13 is moved clockwise. When the bar 11 is in its extreme position (FIG. 1) to the right, the gudgeon 11*a* is located in the semi-circles *6c, 7c* of each of the levers and, therefore, each lever is retracted so that the control member 2 is free to move under the action of spring 3 or the weight of a record. When the bar 11 moves to the left each of the levers 6 and 7 is urged to rotate counterclockwise by the springs 18 and 19 so that the gudgeon 11*a* is not engaged with the sides of the cordiform openings. As seen in FIG. 4, if the control member 2 is opposite the lever 6, the lever 7 will rotate until the idler 9 engages the stepped motor shaft 17 and the flange of the turntable. Then the gudgeon 11*a* is located in the semi-circle 6*a* of lever 6 and the semi-circle 7*b* of the lever 7. The pawl 20 engages notch 11*c* in bar 11 to prevent movement of the bar 11 by spring 12. Spring 21 holds the pawl within the notch. Any suitable means (not shown) may be provided for disengaging the pawl.

The turntable 5 is driven by the motor 16 via a stepped shaft 17 and the idler wheel 8 or 9 bearing against the turntable flange in the manner well known and widely utilized.

The operation of the invention is described as follows:

First alternative (see FIGS. 2 and 4):

A 45 r.p.m. record 22 is disposed on the turntable 5. The centering member 1 remains in place and the rims 1*a* project upwardly through the central opening of the record.

The user lifts the pick-up arm 13 and displaces it in counterclockwise direction; the extension 15, which is connected with the arm, exerts a pressure on the adjusting bar 11, which is thus urged to the left in a straight line as indicated by the arrow.

Both levers 6 and 7 are pivoted about the shaft 10 by the springs 18 and 19 in anti-clockwise direction, but the lever 6 abuts against the blocking member 2, whereas the lever 7 continues its movement (sliding beneath member 2, FIG. 1), so that the idler wheel 9 comes into contact with the inner surface of the turntable and then with the shaft 17, whereby the turntable 5 is driven. The ratio between the diameters of the wheel 9 and of the associated part of the shaft 17 is chosen so that a suitable speed for the turntable 45 r.p.m. is attained.

When the pick-up arm 13 is displaced counterclockwise, return movement of the bar 11 is blocked by the pawl 20. The gudgeon 11*a*, by penetrating into the part 6*a* of the heart-shaped opening, prevents the lever 6 from pressing against the control member 2, and the lever 6 is locked in this position.

Figure 5:
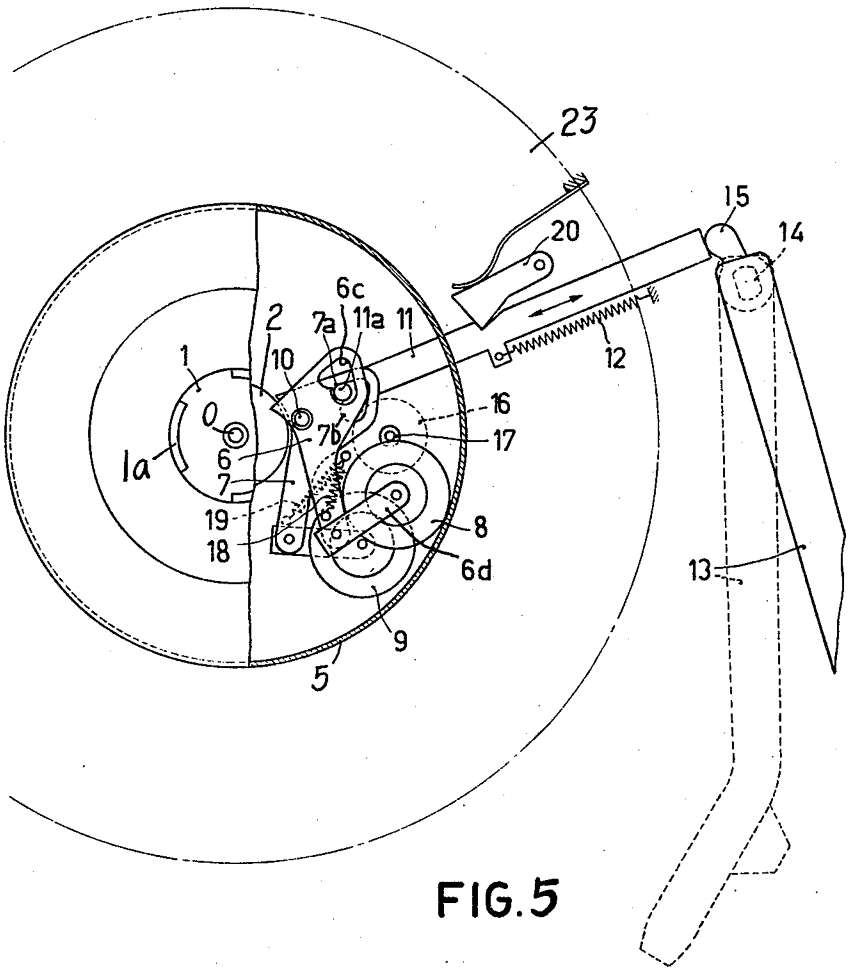
FIG. 5 is a plan view similar to FIG. 4 showing the other position of the speed changing mechanism (for 33 r.p.m. records).

Second alternative (see FIGS. 3 and 5);

A 33 r.p.m. record 23 having a small central opening is disposed on the turntable 5, so that by the weight thereof, the member 1 together with the control member 2 is moved downwardly to the level or plane of the lever 7.

When the user actuates the arm 13, the various parts of the device are moved in the same manner as described above in the first alternative, the levers 6 and 7, however, interchange their places, since the lever 7 does not move and the lever 6 passes over member 2 and the wheel 8 is moved to a transmission position in between the driving shaft 17 and the turntable 5.

At the termination of the movement of the bar 11, from right to left as viewed in the drawing, the gudgeon 11*a* locks the lever 7 in order to avoid that the lever 7 engages the control member 2, by penetrating into the part 7*b* of the associated opening. The ratio between the diameters of the wheel 8 and of the associated part of the shaft 17 is chosen so that a suitable speed for the record (33 r.p.m.) is obtained.

What is claimed is:

1. The combination with a record player of apparatus for automatically selecting the speed of the record player turntable according to the diameter of the spindle opening of a record to be played; said apparatus comprising:

a base member, a motor supported on said base member, said motor having a stepped shaft, a flanged turntable, a turntable shaft on said base member for rotatably supporting said flanged turntable, the longitudinal axis of said stepped shaft being in a plane parallel with the turntable shaft and adjacent the turntable flange, a record centering member and means supporting said centering member on said turntable for engagement with a record on said turntable and for displacement of said centering member in an axial direction with respect to the turntable shaft, a control member connected wtih said record centering member spaced therefrom in said axial direction for movement therewith in said axial direction and concentric with said turntable shaft, a pair of spaced levers and means on said base member for pivotally supporting said levers in a plane parallel with the plane of said turntable adjacent said control member, a pair of idler wheels, each said lever supporting an idler wheel for movement into and out of engagement with both said stepped shaft and the adjacent flange of said turntable, means connecting the control member and the record centering member for limiting movement of said control member for alignment with one or the other of said levers, means connected with said levers for rotating said levers so that each lever is moved toward said control member whereby said lever which is un-aligned with said control member is pivotally moved until the associated idler wheel engages said stepped shaft and turntable flange.

2. The combination with a record player of apparatus for automatically selecting the speed of the record player turntable according to the diameter of the spindle opening of a record to be played; said apparatus comprising:

a base member, a motor supported on said base member, said motor having a stepped shaft, a flanged turntable, a turntable shaft on said base member for rotatably supporting said flanged turntable, the longitudinal axis of said stepped shaft being in a plane parallel with the turntable shaft and adjacent the turntable flange, a record centering member and means supporting said centering member on said turntable for engagement with a record on said turntable and for displacement of said centering member in an axial direction with respect to the turntable shaft, a control member connected with said record centering member spaced therefrom in said axial direction for movement therewith in said axial direction and concentric with said turntable shaft, a pair of spaced levers and means on said base member for pivotally supporting said levers in a plane parallel with the plane of said turntable adjacent said control member, a pair of idler wheels, each said lever supporting an idler wheel for movement into and out of engagement with both said stepped shaft and the adjacent flange of said turntable, means connecting the control member and record centering member for limiting movement of said control member for alignment with one or the other of said levers, means connected with said levers for rotating said levers so that each lever is moved toward said control member whereby said lever which is un-aligned with said control member is pivotally moved until the associated idler wheel engages said stepped shaft and turntable flange, and means operatively connected with each said lever for locking only the lever aligned with said control member in spaced relation therewith.

3. The combination according to claim 2 wherein said last named means comprises an identical cordiform opening in each said lever, each said opening being bounded by a pair of adjacent arcs forming a point at their junction and a single arc opposite said point and spaced therefrom and a pair of substantially straight lines tangential to said pair of adjacent arcs and said single arc, a gudgeon, said gudgeon extending into each said cordiform opening, a sliding rod on said base member, said sliding rod movably supporting said gudgeon for movement in said openings from a position in said single arc to a position in a different one of said pair of adjacent arcs whereby one of said levers is held in spaced relation with the aligned control member.

4. The combination according to claim 2 wherein said means for rotating said levers comprises spring means attached to each said lever for urging each said lever toward the axis of said turntable.

5. The combination according to claim 4 wherein said means for locking said lever aligned with said control member in spaced relation therewith comprises a pawl means operatively connected with said sliding rod for positioning said gudgeon in engagement with the point of said cordiform opening at one side thereof to space the aligned lever from said control member.

6. The combination according to claim 5 with the addition of a tone arm wherein said sliding rod is operably connected with the tone arm and moved by movement of said tone arm away from the axis of said turntable.

References Cited by the Examiner

UNITED STATES PATENTS

| | | | |
|---|---|---|---|
| 2,762,627 | 9/1956 | Johnson | 274—39 |
| 2,943,861 | 7/1960 | Redfield | 274—39 |

FOREIGN PATENTS

| | | |
|---|---|---|
| 1,215,253 | 4/1960 | France. |
| 1,246,823 | 10/1960 | France. |

LOUIS J. CAPOZI, *Primary Examiner.*

ANTONIA F. GUIDA, *Examiner.*